(No Model.)
A. STONER, S. J. HATCHER & W. H. CARROLL.
FENDER FOR PLOWS.
No. 355,482. Patented Jan. 4, 1887.
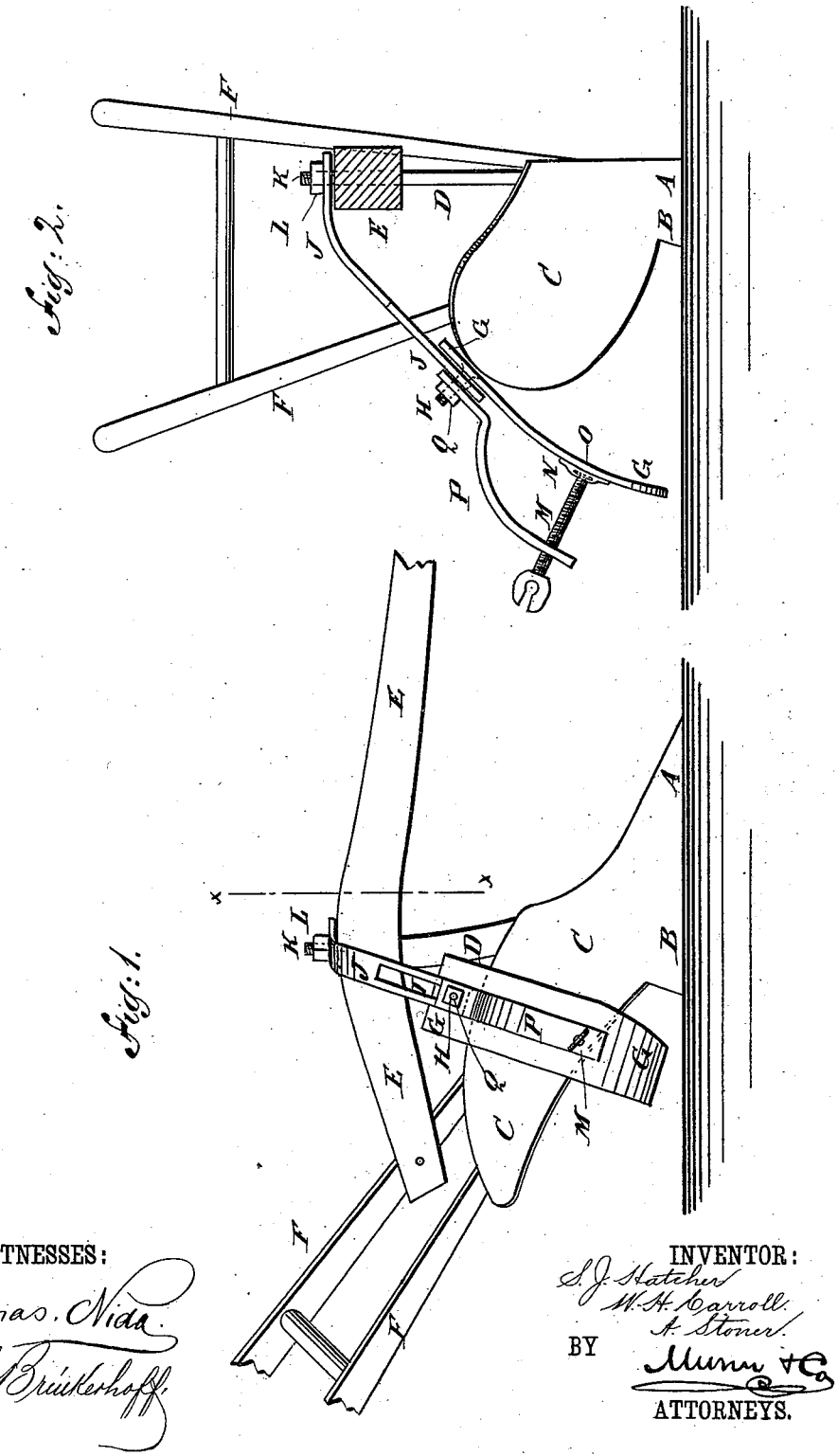

UNITED STATES PATENT OFFICE.

ABRAHAM STONER, SIMEON J. HATCHER, AND WILLIAM H. CARROLL, OF STONY POINT, LOUISIANA, ASSIGNORS OF ONE-HALF TO SAID STONER AND ONE-FOURTH EACH TO SAID HATCHER AND CARROLL.

FENDER FOR PLOWS.

SPECIFICATION forming part of Letters Patent No. 355,482, dated January 4, 1887.

Application filed July 23, 1886. Serial No. 208,864. (No model.)

*To all whom it may concern:*

Be it known that we, ABRAHAM STONER, SIMEON J. HATCHER, and WILLIAM H. CARROLL, all of Stony Point, in the parish of East Baton Rouge and State of Louisiana, have invented a new and useful Improvement in Fenders for Plows, of which the following is a full, clear, and exact description.

Reference is to be had to the accompanying drawings, forming a part of this specification, in which similar letters of reference indicate corresponding parts in both figures.

Figure 1 is a side elevation of a plow to which our improved fender has been applied, parts of the beam and handles being broken away. Fig. 2 is a front elevation of the same, the beam being shown in section through the line *x x*, Fig. 1.

The object of this invention is to provide fenders for plows constructed in such a manner as to prevent plants from being covered or injured by soil, clods, or lumps thrown by the plows, and which can be readily adjusted to allow any desired quantity of soil to be thrown around the plants.

The invention consists in the construction and combination of the various parts of the fender, as will be hereinafter fully described and then claimed.

A represents the point, B the share, C the mold-board, D the standard, E the beam, and F the handles, of an ordinary plow.

G is the fender-plate, the lower par of which is curved inward, as shown in Fig. 2, and the lower corner of its forward edge is rounded, as shown in Fig. 1. The upper end of the fender-plate G is perforated to receive the bolt H, that also passes through the slot I in the straight lower part of the connecting-bar J. The upper end of the bar J is bent downward to rest and fit upon the top of the plow-beam E, and is perforated to receive the bolt K, formed upon or connected with the upper end of the standard D, and which passes through the said plow-beam E. The upper end of the connecting-bar J is secured in place by the nut L, screwed upon the bolt K.

M is a hand-screw, the forward end of which passes through the keeper N, attached to the outer side of the lower part of the fender-plate G. The forward end of the screw M has a flat head, O, formed upon or attached to it, which rests between the keeper N and the fender-plate G, so that the said screw will be swiveled to the said fender-plate. The hand-screw M passes through a screw-hole in the lower end of the brace-bar P, which is curved inward, and is then bent upward, so that its upper part will be straight and parallel with the lower part of the connecting-bar J and the upper part of the fender-plate G. The upper end of the brace-bar P is perforated to receive the bolt H, and is secured to the lower end of the connecting-bar J and the upper end of the fender-plate G by the said bolt H and the nut Q, screwed upon the end of the said bolt. With this construction, by loosening the nut Q, the fender-plate G and brace-bar P can be moved up or down upon the connecting-bar J, to adjust the lower end of the said fender-plate farther from or nearer to the ground, and by turning the hand-screw M the lower end of the fender-plate G can be adjusted farther from or nearer to the plow, as may be required.

Sometimes in "laying by" or molding large cotton we may use a shield of suitable form attached to the side of the fender-plate G, to prevent the limbs of the cotton from becoming entangled in the brace-bar P and set-screw M. Such shield or a similar arrangement is not illustrated, being in common use for similar purposes.

Having thus fully described our invention, we claim as new and desire to secure by Letters Patent—

In a fender for plows, the combination, with the connecting-bar J, attached to a plow, the fender-plate G, and the coupling bolt and nut H Q, of the curved brace-bar P, having its upper part flat and perforated to receive the bolt H, and a screw-hole in its lower end, and the hand-screw M, passing through the said screw-hole and swiveled to the said fender-plate, substantially as herein shown and described, whereby the lower part of the said fender-plate can be readily adjusted closer to or farther from the plow, as set forth.

ABRAHAM STONER.
SIMEON J. HATCHER.
WILLIAM H. CARROLL.

Witnesses:
E. J. STILLMAN,
F. F. PUCKETT.